F. NEMEC.
HOSE REEL.
APPLICATION FILED DEC. 23, 1914.
1,177,206.
Patented Mar. 28, 1916.
2 SHEETS—SHEET 2.
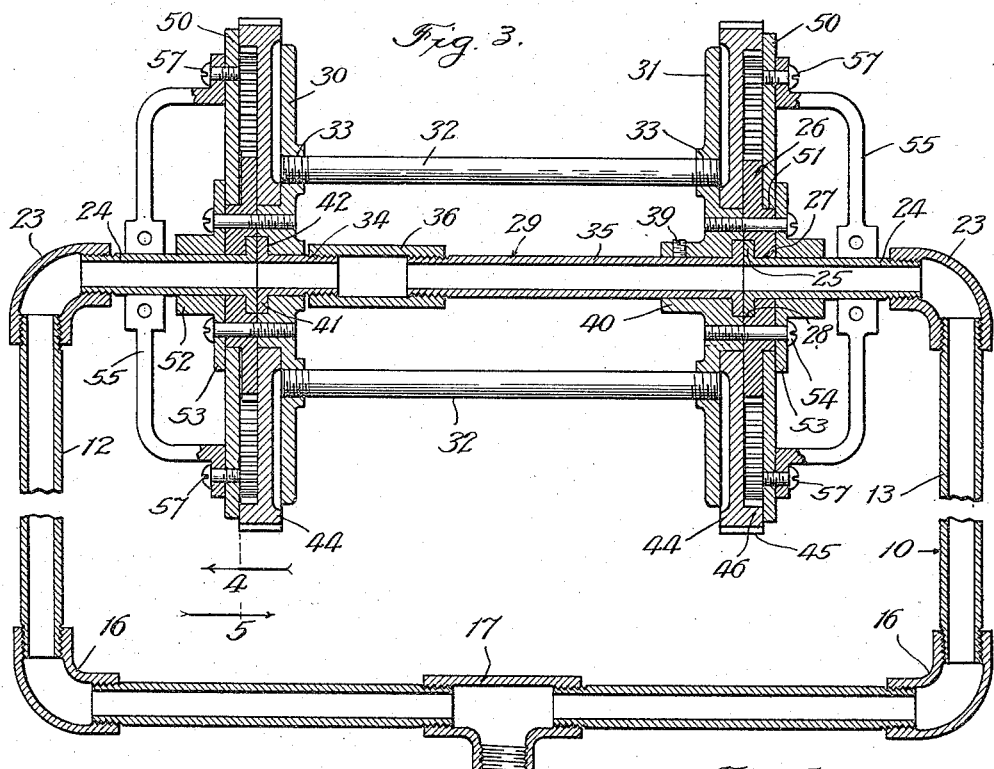
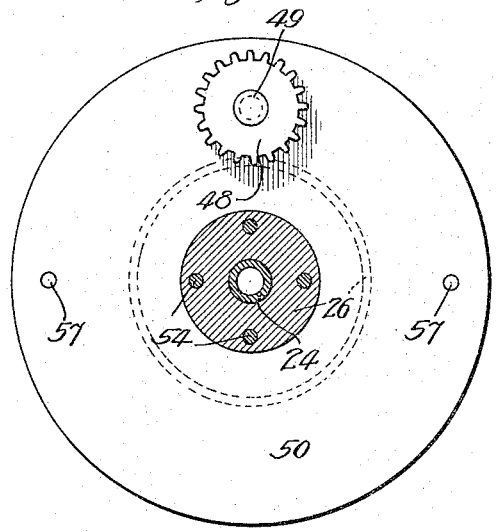
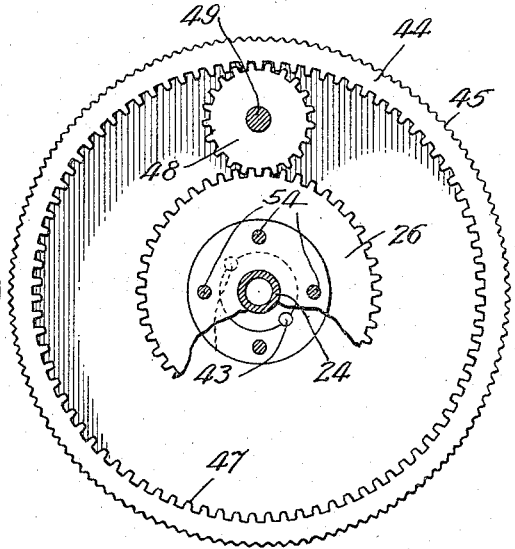
Witnesses:
Inventor:
Francis Nemec,
By Dyrenforth, Lee, Chritton and Wiles.
Attys.

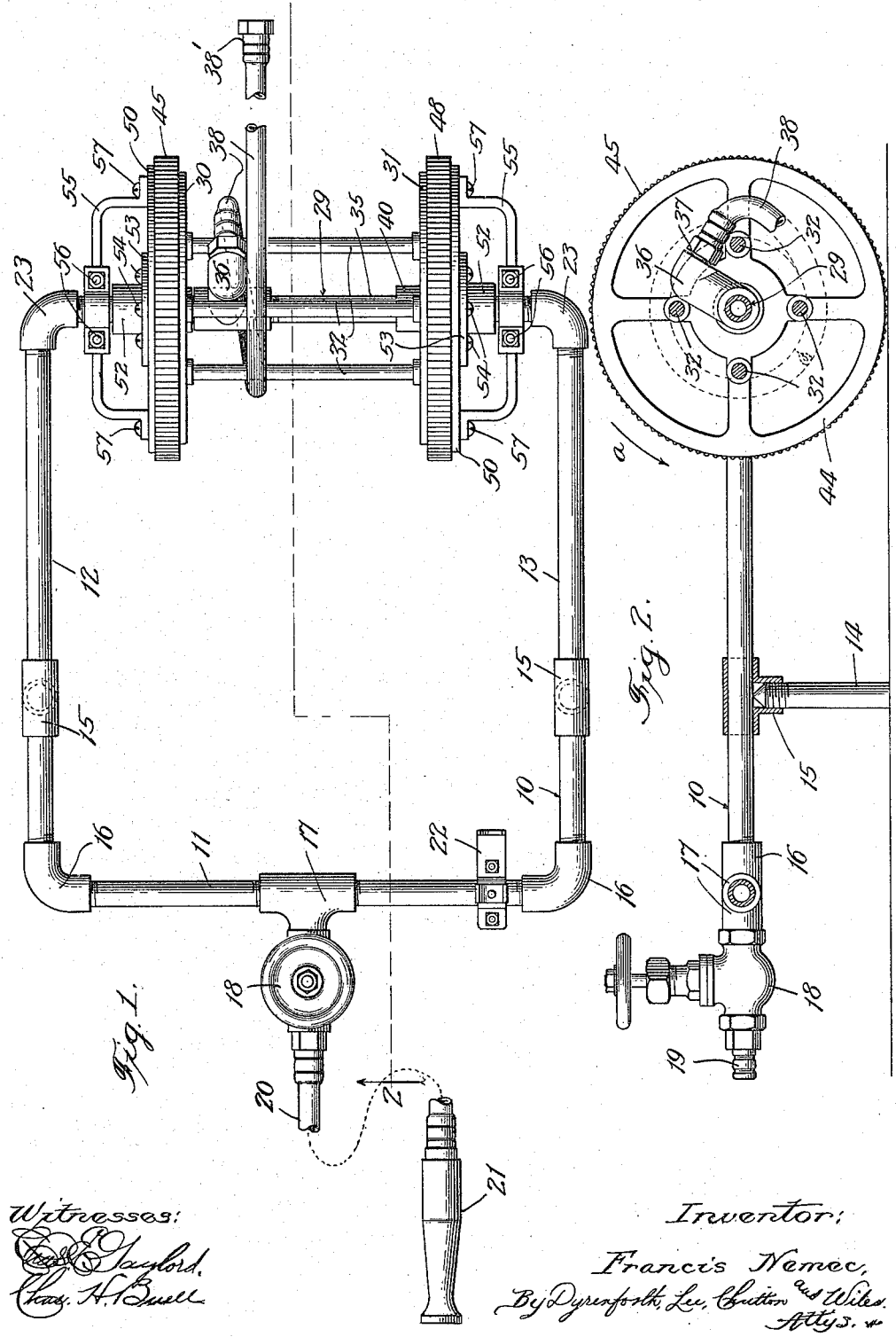

UNITED STATES PATENT OFFICE.

FRANCIS NEMEC, OF CHICAGO, ILLINOIS.

HOSE-REEL.

1,177,206.  Specification of Letters Patent.  Patented Mar. 28, 1916.

Application filed December 23, 1914. Serial No. 878,687.

*To all whom it may concern:*

Be it known that I, FRANCIS NEMEC, a citizen of the United States, residing at Chicago, in the county of Cook and State of Illinois, have invented a new and useful Improvement in Hose-Reels, of which the following is a specification.

My invention relates to improvements in hose reels, and, more particularly, to that type of hose reel in which the winding or reeling drum is connected with the supporting or ground wheels, so that the drum is automatically revolved to pay out or wind up the hose from its surface in proportion to the movement of the reel.

The object of my invention is to provide an improved construction of hose reel of this general type, which is especially suitable for use in connection with garden hose.

More specifically, it is the object of the invention to provide such a hose reel having a tubular frame of strong and simple construction and which serves, at the same time, as a handle and as a support for the reel and in combination with such frame to provide a pair of journals on which ground wheels may be mounted, the said journals also carrying the reel proper which is mounted concentrically with the ground wheels. In combination with this structure, I provide suitable driving connections between the ground wheels and the concentric reel adapted to drive the latter in a proper direction and at a speed proportionate to the movement of the reel over the surface of the ground.

In constructing a hose reel of this type and in accordance with the principles of my invention, I have effected numerous other improvements in the construction and arrangement of the parts, as will more fully appear from the following detailed description of a hose reel constructed in accordance with my invention.

In this description reference will be had to the accompanying drawings, in which—

Figure 1 is a plan view of a hose reel, Fig. 2 is a section on the line 2—2, of Fig. 1, Fig. 3 is an enlarged horizontal section through the hose reel of my invention, a portion of the frame being broken away, Fig. 4 is a section on the line 4 of Fig. 3, and Fig. 5 is a section on the line 5 of Fig. 3.

Referring more particularly to the drawings, the numeral 10 indicates in general the frame of my hose reel. This frame consists of a transverse front member 11, which serves as the handle of the reel, and longitudinal members 12, 13, each of which carries a supporting foot 14 intermediate its length. The supporting feet 14 are preferably secured within the threaded bores of T-couplings 15 which are sleeved upon the frame members 12, 13. As is best shown in Fig. 3, the frame members 11, 12 and 13 are constructed as hollow tubes connected with one another by means of standard elbows 16. The transverse frame member 11 has interposed in its length a T-coupling 17, which carries a control valve 18, and secured to this valve is a nipple 19, on which may be fastened a very short length of hose, indicated in Fig. 1 of the drawings at 20, and carrying a conventional spray-nozzle 21 at its outer end. When not in use the spray-nozzle 21 may be conveniently held in a suitable saddle 22 (shown in Fig. 1 of the drawings), which may be clamped about the frame member 11.

At their rear extremities the longitudinal frame members 12, 13, are provided with elbows 23 in which are mounted the inwardly-extending tubular-stub-shafts 24. Each of these stub-shafts is provided with a flanged head 25 and journaled upon each stub-shaft, adjacent the flanged head thereof, is a gear wheel 26, which bears upon the stub-shaft at 27 and is counter-bored at 28 to receive the flanged head 25. The hose drum or reel proper is carried by the gear wheels 26 and comprises a central shaft 29, end-flanges 30 and 31, and hose-supporting bars 32, preferably four or more in number and spaced symmetrically about the shaft 29 and secured to the end-flanges, as by being threaded in bosses 33 therein. As shown in Fig. 3, the reel shaft 29 is preferably made up of two sections 34 and 35 connected by a T-coupling 36, the extending leg of which carries a nipple 37 which serves for the attachment of the hose 38. The tubular shaft section 35 is secured to the end-flange 31 by a set-screw 39 passing through an extending hub-boss 40 formed integrally with the flange 31. Each of the shaft sections 34, 35 is preferably provided with an enlarged flange head 41 which seats within a counter-bored recess 42 in the outer face of the flanges 30, 31. In order to secure the shaft section 34 to the flange 30, I preferably provide dowel pins 43 (see Fig. 5) which are inserted in bores intersecting the joint between the flanged head 41 and the end-flange 30. This construction is made use of in order that the T-coupling 36 may be placed as close as is practicable to the end-flange 30, and without the interposition of any hub-boss on the latter member.

Each of the end-flanges 30, 31 of the reel structure is provided with an outwardly-facing annular boss on which is journaled a ground wheel 44 of diameter somewhat greater than the diameter of the end-flanges 30, 31. The ground wheels 44 are preferably provided with ribs or corrugated surfaces, as indicated at 45, in order that these wheels may have sufficient friction to enable them to drive the reel or drum for the purpose of paying out or taking up the hose. Each ground wheel is formed with an outwardly-facing flange 46 on the inner cylindrical face of which are formed the annular gear teeth 47. In order to form a driving connection between the annular gear wheel 47 and the gear wheels 26, which carry the drum, I provide planet pinions 48. These pinions are carried by journal pins 49 which are mounted in cover-plates 50, the cover-plates being annular in form and mounted upon enlarged hub-bosses 51 formed upon the gear wheels 26. Sleeved upon the stub-shafts 24, outside of the gear wheels 26, are collars 52, the flanged heads 53 of which are greater in diameter than the hub-bosses 51 of the gear wheels 26 and thereby serve to confine the cover-plates 50 and to hold these plates against axial displacement. The collars 52, gear wheels 26 and end-flanges 30 and 31, respectively, are all held together, so as to be driven as a unit by means of screw-bolts 54 passing through proper apertures in the flanges 53 and in the gear wheels 26 and being tapped into threaded apertures in the end-flanges. In order to secure the cover-plates 50 against rotation, I have fixed upon each of the stub-shafts 24 a two-armed spider 55, the spiders being clamped about the stub-shafts, as by bolts 56, and having their arms secured to the cover-plates by screws, as shown at 57.

The operation of my improved hose reel is as follows: Assuming that a considerable length of hose is wound upon the bars 32, which form the drum surface of my hose reel, the free end of the hose which will commonly carry a coupling, such as is shown at 38' in Fig. 1, will be attached to the hydrant and the water will be turned on at the hydrant. The water will then enter through the free end of the hose 38, pass through those coils of the hose which are wound upon the drum and thence to the nipple 36 which connects with the tubular shaft 29 of the drum. Flowing through this shaft, the water will enter the tubular stub-shafts 24 and through them flow outwardly through the tubular frame members 12, 13 and 11, thence to the controlling valve 18 and, if the latter be opened, out of the short section 20 of the hose and will be sprayed from the nozzle 21. It will readily be understood that the nozzle 21 may be supported in the carrier 22 in such a manner as to act as a fountain-head, or, if desired, an additional fountain-head of any appropriate type may be secured to the nipple 19 of the valve 18 in place of the hose section 20. If it is now desired to carry the water to some place distant from the hydrant, the handle 11 of the frame may be raised to lift the supporting feet 14 clear of the ground and the hose reel may then be pulled to any desired position. In this forward movement of the hose reel, the ground wheels 44 will rotate in the direction indicated by the arrow $a$ in Fig. 2, such rotation of the ground wheels being insured by reason of their corrugated surfaces. Through the rotation of the ground wheels, the planet pinions 48 will be driven, and from these pinions the gear wheels 26 which carry the hose drum will be revolved to turn the latter in the direction opposite the arrow $a$ in Fig. 2, thus paying out the hose 38 from the upper surface of the drum. The relative diameters of the annular gears 47 and the gear wheels 26 is such as to pay out the hose 38 at a rate of speed equal to the linear velocity of the ground wheels over the surface of the ground. It will be apparent, therefore, that in pulling my reel forward, the hose 38 will be unwound from the surface thereof at a proper speed and will lie flat upon the ground without being subjected to the strains incident to pulling, or to the wear resulting from dragging the hose across the surface of the ground. By reason of this accurate paying out of the proper quantity of hose proportionate to the movement of the reel over the surface of the ground, I am thus able to protect the hose effectively from any possibility of injury and the lighter and cheaper grades of garden hose may, therefore, be used instead of the heavy armored hose, which it is now considered necessary to use in all conditions of service in which the hose is subjected to constant moving over the surface of the ground.

It will also be understood that when the hose reel is pushed backwardly toward the hydrant, the ground wheels 44 will operate to revolve the hose drum in a direction and at a speed which will pick up the hose and wind it upon the drum in a proper manner. When using a hose reel constructed in accordance with the principle of my invention, therefore, it is only necessary to attach the free end of the hose to the hydrant and the reel may then be pulled or pushed from place to place around the grounds and within the length of the hose, without paying any attention to the latter, the construction and operation of the parts being such that the hose is automatically payed out from or rewound upon the surface of the drum accordingly, as the reel is pulled away from the hydrant or pushed back toward the hydrant.

It will further be noted in connection with my invention that the arrangement of the parts is such as to permit of the reel and the ground wheels being mounted upon a common shaft and co-axially. It may further be noted that the moving or operative parts, including the gear wheels, are perfectly housed by a single pair of cover-plates 50, the device being thereby rendered simple and attractive in appearance and at the same time being protected, as to its working parts from the action of the elements.

While I have shown and described in considerable detail one specific embodiment of my invention, I wish it to be understood that such showing and description is illustrative only and that I do not regard my invention as limited to the features of construction illustrated and described, or to any of them, except in so far as such limitations are included within the terms of the following claims, in which it is my intention to claim all novelty inherent in the invention, as broadly as the prior art will permit.

What I claim as new and desire to secure by Letters Patent is:—

1. In a hose reel of the class described, a bifurcated frame, a pair of spaced ground wheels journaled in said frame between the ends of the branches thereof, a hose reel journaled in said frame between said ground wheels and concentrically thereof, driving connections between said ground wheels and said drum, said connections including an annular gear carried by a ground wheel, a central gear carried by said drum and a planet pinion meshing with said gears and carried by said frame, a hose fixed to said drum at one end, and fluid-conducting connections between the fixed end of said hose and said frame.

2. In a hose reel of the class described, a tubular frame, tubular stub-shafts carried by said frame, gear wheels journaled on said stub-shafts, a hose drum carried by said gear wheels, and having a central tubular shaft the bore of which is in communication with said stub-shafts, ground wheels journaled on said hose drum, annular gears carried by said ground wheels, and planet pinions carried by said frame and meshing with said ground wheel gears and said drum gears.

3. In a hose reel of the class described, a frame comprising a tubular transverse front member, a water outlet carried by and in communication with said member, tubular longitudinal members in communication with said front member, frame supports secured to said longitudinal members, alining tubular stub-shafts carried by the rear extremities of said longitudinal members, a hose drum journaled upon said stub-shafts, and having a tubular shaft in communication with the bores of said stub-shafts, means for securing a hose to said tubular drum shaft, ground wheels mounted concentrically of said drum, and driving connections between said ground wheels and said drum.

4. In a hose reel of the class described, a frame comprising a tubular transverse front member, a water outlet carried by said member, longitudinal tubular frame members in communication with and connected to said transverse member, frame supports carried by said longitudinal members intermediate their length, tubular stub-shafts carried by the rear extremities of said longitudinal members, and in communication therewith, gear wheels journaled upon said stub-shafts, a hose drum carried between said gear wheels, said drum having a hollow tubular shaft in communication with said stub-shafts, ground wheels journaled upon said hose drum, annular gears carried by said ground wheels, and planet pinions carried by said stub-shafts and forming driving connections between said ground wheel gears and said drum gears.

5. In a hose reel of the class described, a frame comprising a transverse tubular front member, a hose connection carried by said front member, a valve interposed in said hose connection, longitudinal frame members connected to and in communication with said transverse member, alining tubular stub-shafts carried by the rear extremities of said longitudinal members, gear wheels mounted upon said stub-shafts, a hose drum carried between said gear wheels and concentrically thereof, said hose reel having a hollow tubular shaft in communication with said stub-shafts, a hose connection secured to said drum shaft, ground wheels journaled upon said drum, annular gears carried by said ground wheels, spiders mounted upon said stub-shafts, cover-plates carried by said spiders and inclosing said annular gears and said drum gears, and planet pinions carried by said cover-plates and meshing with said annular and drum gears.

FRANCIS NEMEC.

In presence of—
A. C. FISCHER,
N. B. DEARBORN.

Copies of this patent may be obtained for five cents each, by addressing the "Commissioner of Patents, Washington, D. C."